United States Patent [19]

Stein et al.

[11] Patent Number: 5,237,489

[45] Date of Patent: Aug. 17, 1993

[54] HEADLIGHT FOR MOTOR VEHICLES

[75] Inventors: Jürgen Stein; Bernhard Wörner, both of Stuttgart; Fred Delb, Bühl-Oberweier; Thomas Weigold, Baden-Baden; Friedrich Schmied, Pfullingen; Peter Kusserow, Sonnenbühl; Bernd Kaiser, Sexau, all of Fed. Rep. of Germany

[73] Assignee: Robert Bosch GmbH, Stuttgart, Fed. Rep. of Germany

[21] Appl. No.: 846,993

[22] PCT Filed: Jun. 26, 1991

[86] PCT No.: PCT/DE91/00517

§ 371 Date: May 26, 1992

§ 102(e) Date: May 26, 1992

[87] PCT Pub. No.: WO92/02757

PCT Pub. Date: Feb. 20, 1992

[30] Foreign Application Priority Data

Aug. 2, 1990 [DE] Fed. Rep. of Germany ....... 4024495

[51] Int. Cl.$^5$ .............................................. B60Q 1/00
[52] U.S. Cl. .................................... 362/61; 362/226; 362/802
[58] Field of Search ................... 362/61, 802, 226, 261

[56] References Cited

U.S. PATENT DOCUMENTS 4,797,790  1/1989  Bradling et al. ..................... 362/61

FOREIGN PATENT DOCUMENTS 2108352  7/1972  Fed. Rep. of Germany .
2643187  3/1978  Fed. Rep. of Germany .
3910191  7/1990  Fed. Rep. of Germany .
4012282  11/1990  Fed. Rep. of Germany .

Primary Examiner—Carroll B. Dority
Attorney, Agent, or Firm—Michael J. Striker

[57] ABSTRACT

A headlight for motor vehicles has a reflector, a gas discharge lamp inserted in the reflector, an electrical pre-switching device arranged to supply the gas discharge lamp with high voltage, a lamp support via which the gas discharge lamp is inserted in the reflector, a detachable protective cap which covers the lamp support and the gas discharge lamp at their rear, an electrical line connected with the pre-switching device, and a switch arranged in the line and openable when the protective cap is removed so that the operation of the gas discharge lamp is prevented when the switch is opened.

5 Claims, 1 Drawing Sheet

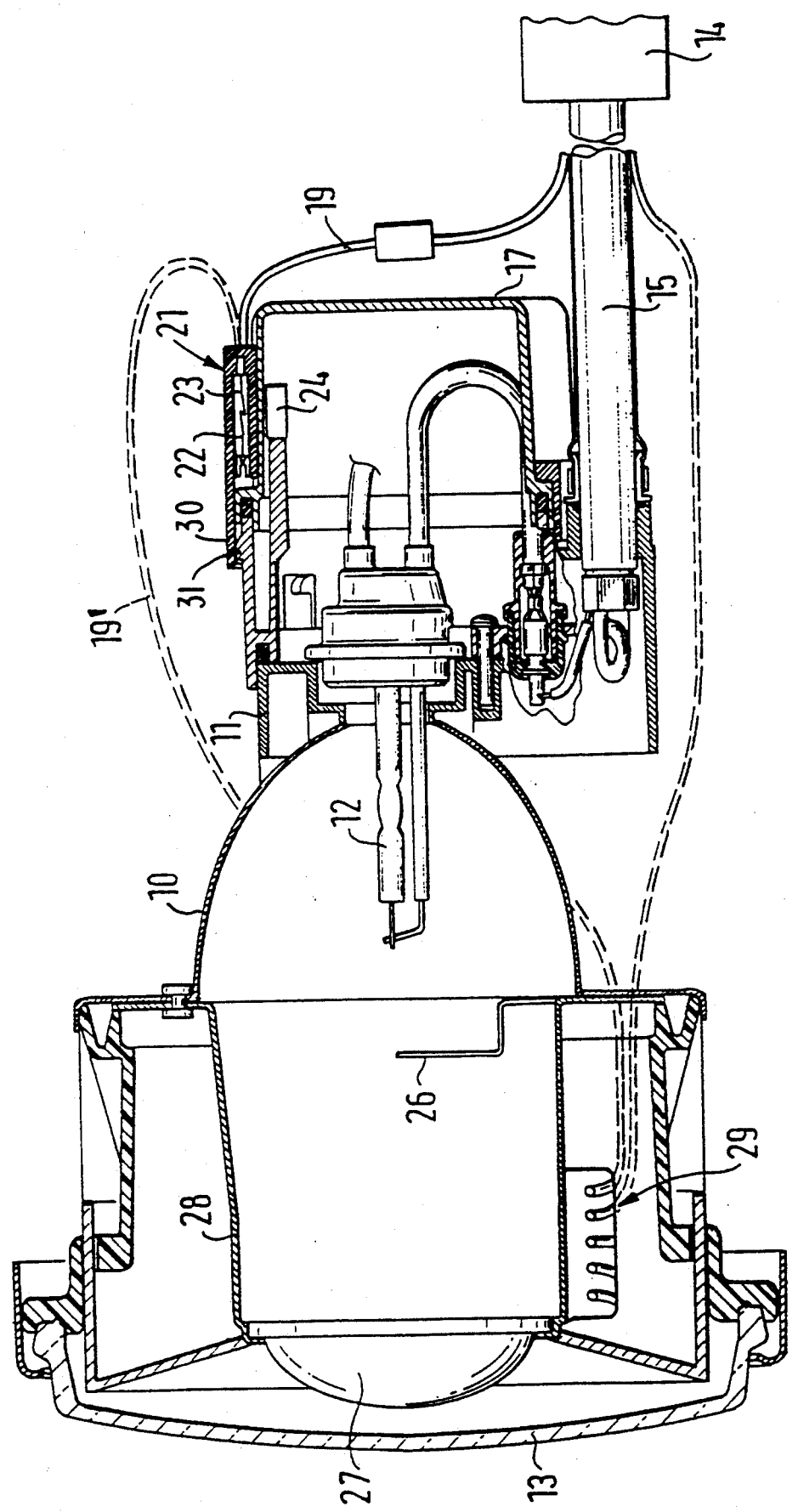

HEADLIGHT FOR MOTOR VEHICLES

BACKGROUND OF THE INVENTION

The present invention related to a headlight for motor vehicles. More particularly it relates to a headlight for motor vehicles which has a reflector and a gas discharge lamp inserted in the reflector and supplied with high voltage by an electrical pre-switching device.

Such a headlight is known from DE-OS 35 19 611. This headlight has a reflector with a gas-discharge lamp inserted in an electrical pre-switching device. The pre-switching device serves to supply high voltage to the gas-discharge lamp and is tightly connected with the reflector. To exchange the gas-discharge lamp, which is not provided for in this headlight, it is necessary to remove the pre-switching device. But this is impossible without destroying the sealed connection between the pre-switching device and the reflector. Moreover, there is a danger of fatal injury when exchanging the gas-discharge lamp if special precautions are not taken because of the high voltage applied to the gas-discharge lamp for its operation.

SUMMARY OF THE INVENTION

Accordingly, it is an object of the present invention to provide a headlight for motor vehicles, which avoids the disadvantages of the prior art.

In keeping with these objects and with others which will become apparent hereinafter, one feature of the present invention resides, briefly stated, in a headlight for motor vehicles in which the gas discharge lamp is inserted in the reflector through a lamp support, the lamp support and the gas discharge lamp are covered at the rear by a detouchable protective cap and an electrical line is connected with the pre-switching device with a switch arranged in the line and openable when the protective cap is removed, while the operation of the gas discharge lamp is prevented when the switch is opened.

When the headlight is designed in accordance with the present invention, it has the advantage that it is possible to exchange the gas-discharge lamp without destroying structural component parts and without risk of fatal injury, since the gas-discharge lamp can not operate when the protective cap is removed.

In accordance with another feature of the present invention the switch can be actuated by magnetic forces and is arranged at the lamp support or at the protective cap, and a magnet is arranged at the other part, lamp support or protective cap by which the switch is kept closed when a protective cap is mounted.

In accordance with still another feature of the present invention, the protective cap can be fastened in a detachable manner by a catch connection. With this construction of the switch, the switch can be actuated without mechanical contact between the lamp support and the protective cap when removing or mounting the protective cap.

In accordance with still a further feature of the present invention, the protective cap can be fastened at the reflector. The reflector can be arranged in a housing and the protective cap can be fastened at the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a headlight for a motor vehicle in accordance with the present invention, in a vertical longitudinal section.

DESCRIPTION OF PREFERRED EMBODIMENTS

A headlight for motor vehicles shown in the drawing has a reflector 10. A gas-discharge lamp 12 held in a lamp support 11 is inserted into the crown area of the reflector 10 from the rear. The light emission opening of the headlight is covered by a light plate 13. The gas-discharge lamp 12 is connected via a line 15 with an electrical pre-switching device 14 which supplies it with the high voltage necessary for its operation. The electrical pre-switching device 14 is connected with the electrical power supply of the motor vehicle and contains, among others, devices for firing the gas-discharge lamp and for ensuring its stable operation. The pre-switching device can be divided into a control part and a firing part. The rear of the gas-discharge lamp 12 and lamp support 11 is covered by a protective cap 17 which can be fastened at the reflector 10 or at the lamp support 11, e.g. by means of a catch connection.

An electrical line 19 is connected with the pre-switching device 14 and contains a switch 21 arranged in the protective cap 17 which is constructed as a so-called reed switch and opens or closes under the influence of magnetic forces. The switch 21 has a tubular housing in which a stationary contact part 22 and a movable contact part 23 are arranged. A magnet 24 is arranged at the lamp support 11 opposite the switch 21. The movable contact part 23 is held in contact with the stationary contact part 22 under the influence of the magnet 24. Without the influence of the magnet, the contact part 23 lifts up and the switch 21 is opened. When the protective cap 17 is not mounted the switch 21 is open and the line 19 is interrupted. A firing or operation of the gas-discharge lamp 11 is prevented by a safety circuit integrated in the control part of the pre-switching device 14. When the protective cap 17 is mounted the switch 21 is closed by the influence of the magnet 24 and the gas-discharge lamp 11 can be operated. The protective cap 17 is mounted in the headlight detachably, for example by a catch connection. As can be seen from the drawings the catch connection includes elastic catch arms 30 provided on the protective cap 17 (of which only one is shown in the drawings) and several outwardly extending projections 31 provided on a part attached to the lamp support 11. In order to mount the protective cap 17 its catch arms 30 are elastically moved on the projections 31, and thereby the protective cap 17 is reliably retained on the member connected with the lamp support 11. By displacing the protective cap 17 in an opposite direction, the elastic catch arms 30 are elastically disengaged from the projections 31 and the protective cap 17 can be removed.

Accordingly, when the protective cap 17 is removed for exchanging the gas-discharge lamp 11 no high voltage can be applied to the gas-discharge lamp 11 so that it is possible to change the lamp without risk.

In a variant which is not shown here the reflector can be arranged in a housing which has an opening at its rear. The protective cap 17 is then fastened at the housing, e.g. at the edge of the opening.

The reflector 10 of the headlight shown in the drawing can be constructed as an ellipsoidal reflector. A diaphragm 26 and a lens 27 can then be arranged in the direction of the light rays reflected by the reflector. The lens 27 is constructed as an ultraviolet filter for the purpose of screening the ultraviolet radiation emitted by the gas-discharge lamp 12 and is arranged in a support 28 which is connected with the front edge of the reflector 10 and is closed at its circumference.

To prevent the gas-discharge lamp 12 from being operated when the lens 27 and accordingly the ultraviolet filter are not intact, the line 19 from the switch 21 is continued in a line 19', shown in dashed lines, to a device 29 in which the line 19' is interrupted when the lens strikes against the device, e.g. as a result of a collision. The operation of the gas-discharge lamp is accordingly also prevented by the safety circuit of the pre-switching device 4 when the lens 27 is damaged.

It will be understood that each of the elements described above, or two or more together, may also find a useful application in other types of constructions differing from the types described above.

While the invention has been illustrated and described as embodied in a headlight for motor vehicles, it is not intended to be limited to the details shown, since various modification and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for motor vehicles, comprising a reflector; a gas discharge lamp inserted in said reflector; an electrical pre-switching device arranged to supply said gas discharge lamp with high voltage; a lamp support via which said gas discharge lamp is supported in said reflector; a detachable protective cap which covers said lamp support and said gas discharge lamp at their rear; an electrical line connected with said pre-switching device; a switch arranged in said line and openable when said protective cap is removed so that the operation of said gas discharge lamp is prevented when said switch is opened; and means for opening said switch when said protective cap is removed.

2. A headlight as defined in claim 1, wherein said switch is actuatable by magnetic forces.

3. A headlight as defined in claim 2, wherein said switch is arranged on one of said lamp support and said protective cap; and further comprising a magnet arranged at another of said lamp support and said protective cap so that said switch can be kept closed when said protective cap is mounted.

4. A headlight as defined in claim 1, wherein said protective cap is fastened in a detachable manner; and further comprising means for detachably fastening said protective cap.

5. A headlight as defined in claim 4, wherein said means for detachably fastening said protective cap includes a catch connection.

* * * * *